(12) United States Patent
Fassbender et al.

(10) Patent No.: US 6,673,240 B2
(45) Date of Patent: Jan. 6, 2004

(54) FEED CONTROL SYSTEM FOR LIQUID CLARIFICATION TANKS

(76) Inventors: John J. Fassbender, Chicago Bridge & Iron Company, 1501 N. Division St., Plainfield, IL (US) 60544-8929; Donald Neil Ruehrwein, Chicago Bridge & Iron Company, 1501 N. Division St., Plainfield, IL (US) 60544-8929

( * ) Notice: Subject to any disclaimer, the term of this patent is extended or adjusted under 35 U.S.C. 154(b) by 71 days.

(21) Appl. No.: 09/810,722

(22) Filed: Mar. 16, 2001

(65) Prior Publication Data

US 2002/0130068 A1 Sep. 19, 2002

(51) Int. Cl.[7] .............................................. B01D 17/12
(52) U.S. Cl. ............................ 210/87; 210/86; 210/90; 210/97; 210/143; 210/519; 210/540; 700/273
(58) Field of Search ............................... 210/86, 87, 90, 210/96.1, 97, 103, 104, 105, 110, 134, 135, 137, 143, 205, 519, 521, 522, 523, 525, 540, 101; 366/151.1, 152.1; 700/266, 273

(56) References Cited

U.S. PATENT DOCUMENTS

| | | | | |
|---|---|---|---|---|
| 3,227,278 A | * | 1/1966 | Johnson | 210/101 |
| 3,473,665 A | * | 10/1969 | Duff | 210/188 |
| 4,146,471 A | * | 3/1979 | Wyness | |
| 4,765,891 A | * | 8/1988 | Wyness | 210/540 |
| 5,110,458 A | * | 5/1992 | Hechler et al. | 210/90 |
| 5,605,636 A | * | 2/1997 | Wyness | 210/519 |
| 5,695,648 A | * | 12/1997 | Fassbender et al. | |
| 5,804,062 A | | 9/1998 | Wyness | 210/86 |
| 6,224,778 B1 | * | 5/2001 | Peltzer | 210/96.1 |
| 6,408,227 B1 | * | 6/2002 | Singhvi et al. | |

FOREIGN PATENT DOCUMENTS

| | | | |
|---|---|---|---|
| SU | 637126 | * | 12/1978 |
| SU | 674760 | * | 8/1979 |
| SU | 916416 | * | 4/1982 |
| SU | 1011163 | * | 4/1983 |
| SU | 1255586 | * | 9/1986 |
| SU | 1318534 | * | 6/1987 |

OTHER PUBLICATIONS

"Micro–Controller System for Water and Sewage Works", Fuji Electric Review vol. 24, No. 1/1978, C. Fuji Electric Co. Ltd., Tokyo, Japan.*

CBI Walker, CLARICONE Operating Manual, Mar., 1999.

* cited by examiner

*Primary Examiner*—Joseph Drodge
(74) *Attorney, Agent, or Firm*—Marshall, Gerstein & Borun LLP

(57) ABSTRACT

A control system for an upflow clarification tank comprises a regulator for controlling one or more characteristics of the flow within the tank (such as the power, pressure, velocity, momentum, or velocity head of the flow), a sensor for measuring one or more of the characteristics of the flow, and a linkage that automatically adjusts the regulator to a desired setting based on the sensor measurement. A processor may be used to determine the desired setting for the regulator. The control system may also include structure enabling the operator to manually select between multiple methods for determining the desired setting.

47 Claims, 16 Drawing Sheets

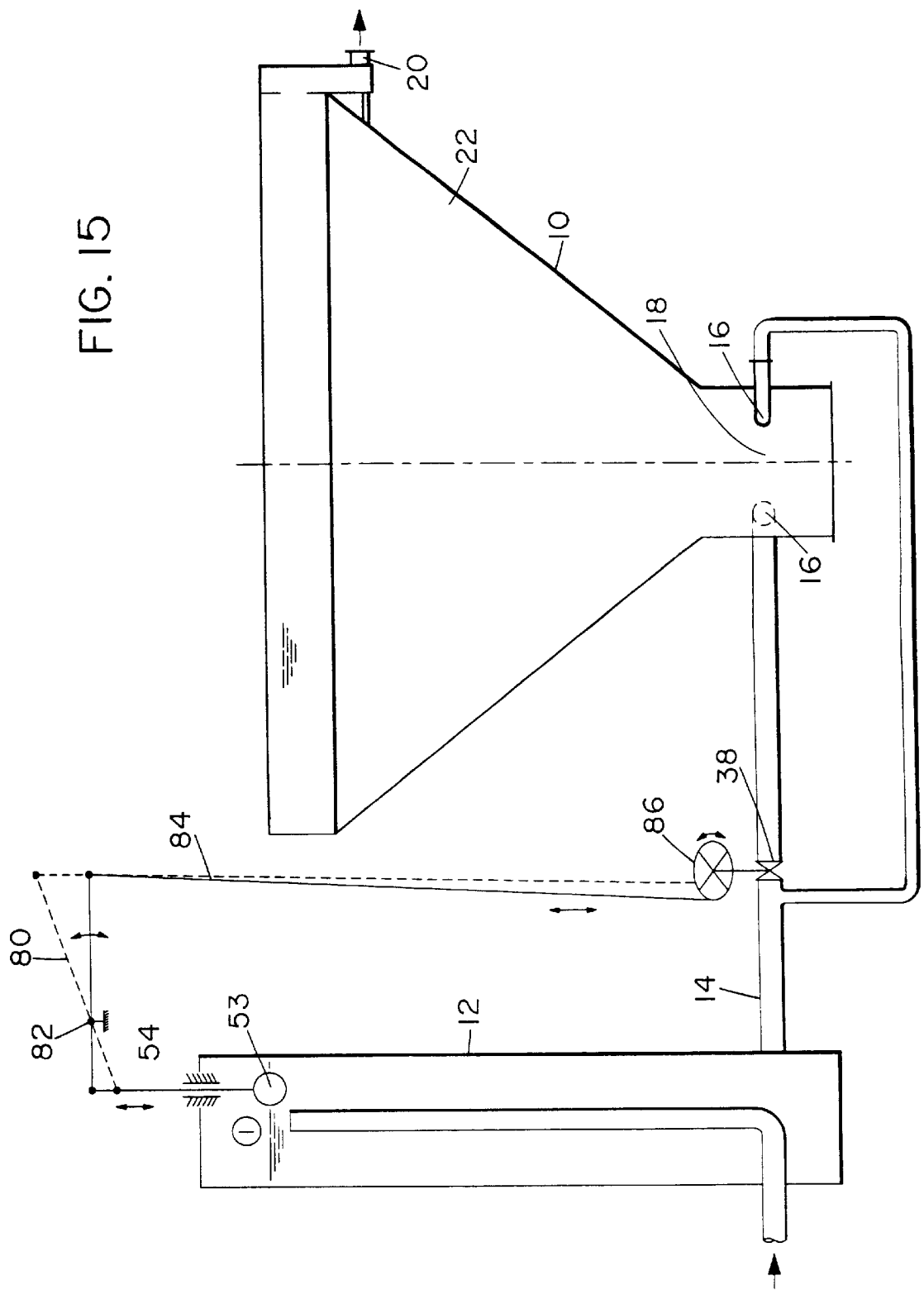

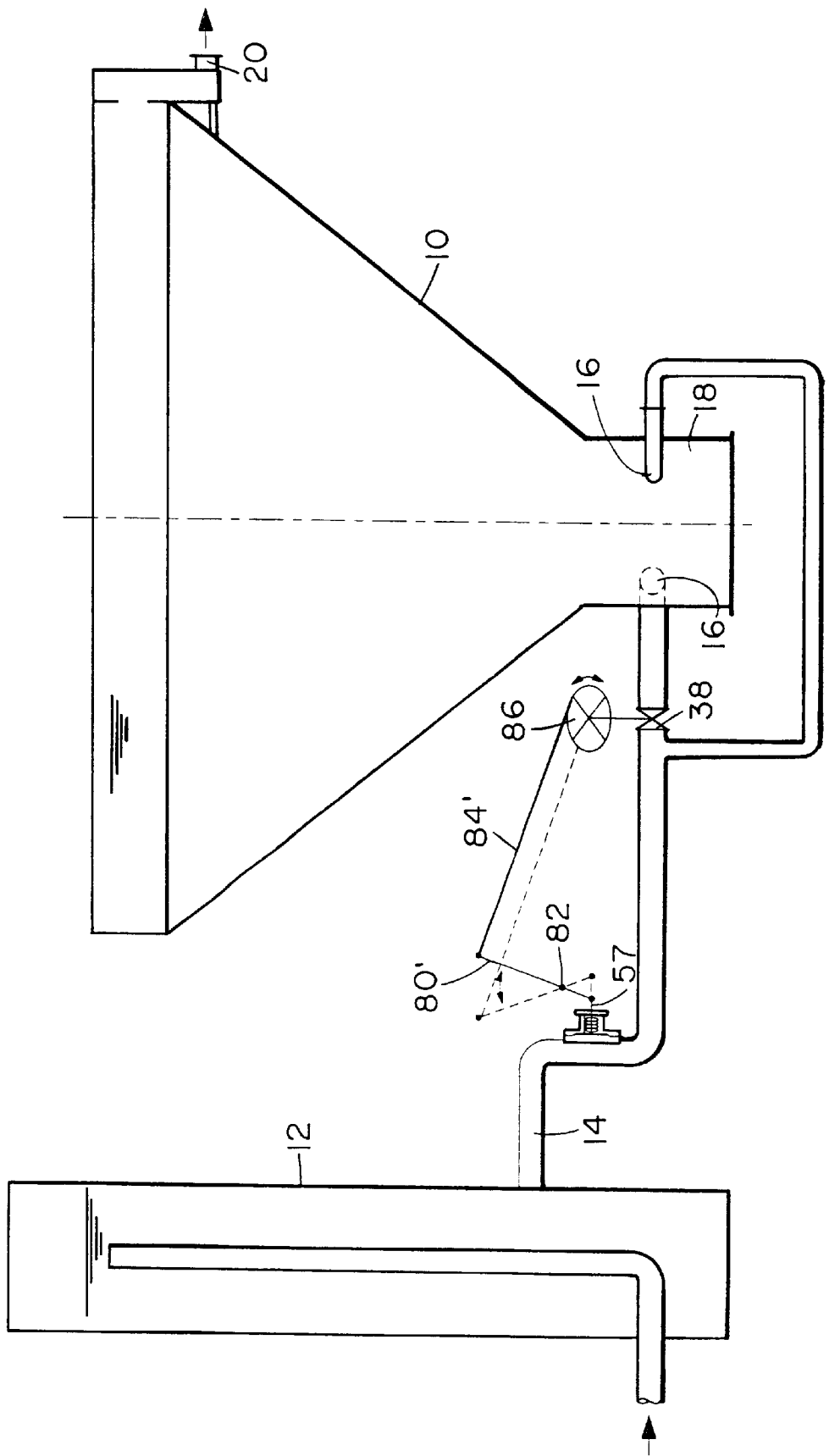

FEED CONTROL SYSTEM FOR LIQUID CLARIFICATION TANKS

BACKGROUND OF THE INVENTION

This invention relates generally to upflow clarification tanks, in which liquids are clarified by being directed in an upward helical path that causes the liquid to gradually decrease in velocity until precipitated or suspended solids separate from the rising water to create a rotating sludge blanket beneath a region of clarified water. More particularly, the invention is directed to feed control systems for such tanks.

An upflow clarification tank, such as those disclosed in Wyness U.S. Pat. Nos. 4,146,471 and 4,765,891, is a specific type of clarification tank that has a prominent conical portion with the larger diameter at the upper end. Typically, the walls of the clarification tank are angled at between about 40 degrees and 60 degrees with respect to the horizontal, although angles outside of this range can also be used. Contaminated water enters the tank at an inlet near the lower end, while clarified effluent is removed from an outlet near the upper end. Inside, the water is given a rotational movement, often in part by feeding it into the tank in a tangential direction, resulting in a generally upward helical flow of the water within the tank.

The increasing diameter of the tank toward its upper end causes a decrease in velocity of the flow of liquid as it moves upwardly. As the velocity decreases, suspended solids having a higher density than water agglomerate and separate from the water, forming a revolving sludge blanket that remains behind as clarified water continues upward until being withdrawn as clarified effluent.

In some conventional upflow clarification tanks, an increase in the flow rate into the clarifier can lead to increased velocities throughout the tank that could disturb the sludge blanket. Conversely, a decrease in the flow rate into the tank can lead to decreased velocities throughout the tank that may not be sufficient to keep the sludge blanket rotating and suspended in an optimal manner. Accordingly, some clarification tanks include a mechanism for controlling the entry of the liquid into the tank in order to help maintain the stability of the sludge blanket. For example, some tanks have been provided with a velocity baffle at or near the liquid inlet. The baffle can adjust the velocity of the flow in the lower sections by either changing the inlet direction or changing the cross-sectional area of the inlet. An operator can adjust the velocity baffle when he or she visually detects a disturbance or potential problem in the sludge blanket. More recently, some tanks have been provided with a pair of inlets having different cross-sectional areas. When an operator detects a disturbance or potential problem in the sludge blanket, he or she can use a valve to redistribute the entry of liquid between the two inlets in an effort to maintain desirable operating conditions.

SUMMARY OF THE INVENTION

The invention relates to a control system that enables automatic control over the entry of liquid into a clarification tank, permitting reduced reliance on the observations and or adjustments of a human operator. Like prior systems, the new system includes a regulator (such as a velocity baffle or pair of differently-configured inlets through which the flow can be controllably routed) for varying one or more objectively-determinable characteristics of the flow (such as the liquid level in a head tank, or the velocity, velocity head, momentum, or power of the liquid at some point in the system). Unlike prior systems, however, the new control system includes a sensor for measuring a value of one or more characteristics of the flow, and means for automatically adjusting the regulator based on the measured value.

The sensor may measure either pressure (or liquid level) or flow rate (or velocity) of the flow. Such sensor measurements may also be used to calculate other characteristics of the flow, such as velocity head, momentum, or power. Because many characteristics of a flow in a liquid clarification tank are mathematically interrelated, the sensor may be positioned so as to measure the pressure or flow rate at virtually any point in the supply line, an inlet line, or the tank itself. That measurement can then be used to adjust the regulator. This can be done directly through a mechanical connection, or indirectly by using a processor that uses a measured value to determine a desirable setting for the regulator. A desirable setting can be expressed either in terms of an incremental change in the setting of the regulator (for example, an opening or closing of a valve by 5%) or in terms of an absolute setting (for example, a valve being set at a 45% open position). The desirable setting can be effectuated through the use of a relay that communicates the setting to the regulator.

BRIEF DESCRIPTION OF THE DRAWINGS

The invention may be better understood by reference to the accompanying drawings, in which:

FIGS. 1–8, 15, and 16 are schematic views of various embodiments of control systems in accordance with the present invention.

DETAILED DESCRIPTION OF THE INVENTION

Figure 1:
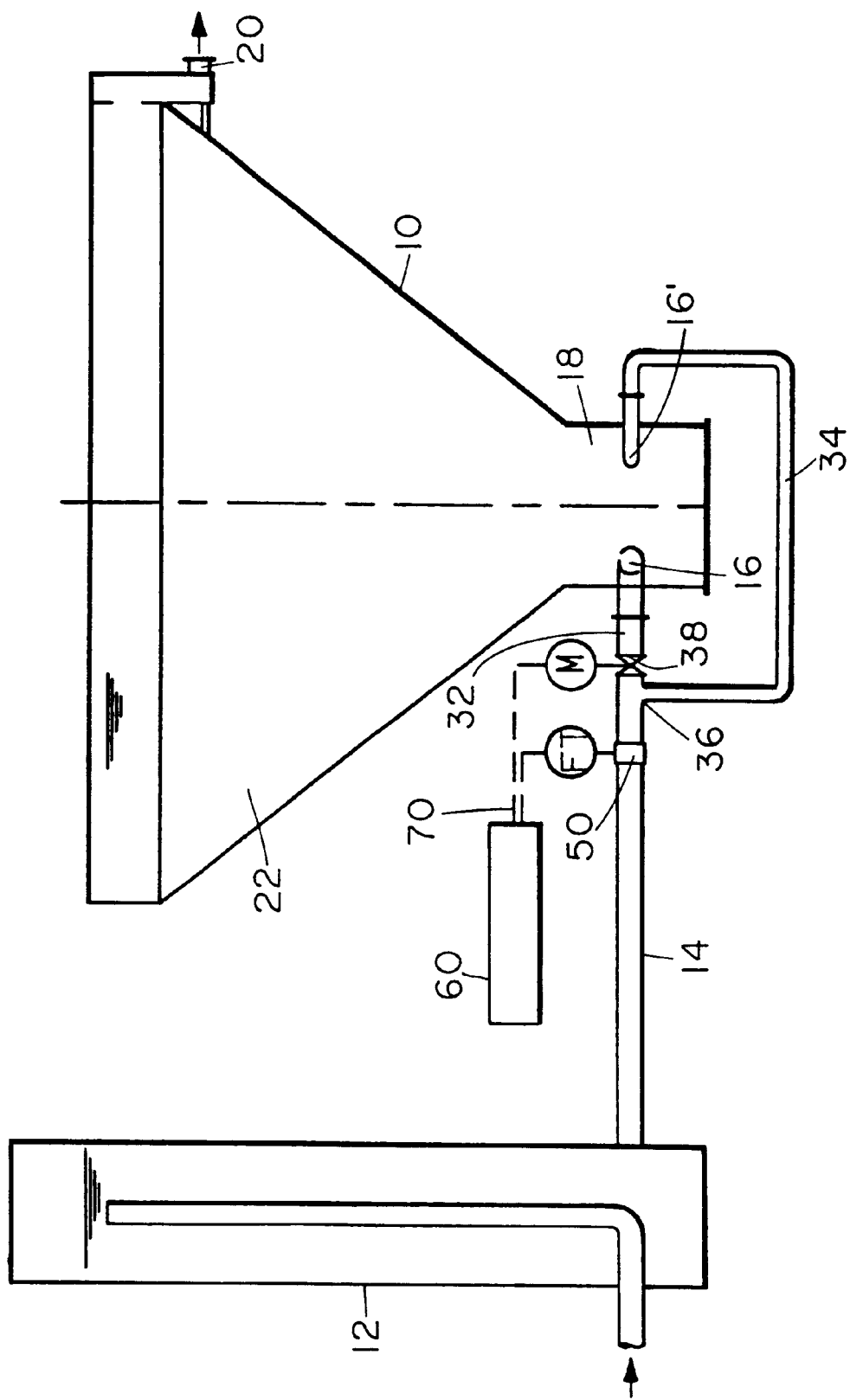

FIGS. 1–8, 15, and 16 show examples of control systems for upflow clarification tanks in accordance with the present invention. The systems include a conventional upflow clarification tank 10, a head tank 12, and a supply line 14 from the head tank to the clarification tank. The supply line feeds into the clarification tank through one or more inlets 16, 16' in a lower section 18 of the clarification tank. Clarified liquid is withdrawn from the clarification tank through an outlet 20 near a wider upper section 22 of the clarification tank. The dynamics of the clarification process are described, for example, in U.S. Pat. Nos. 4,146,471 and 4,765,891.

The Regulator

Each of the illustrated systems controls one or more characteristics of the flow within the tank. The controlled characteristic is preferably an objectively-determinable one, such as the head (or pressure) of the flow, the velocity of the flow, or some function of the velocity of the flow, such as the velocity head of the flow (i.e., the square of the velocity divided by twice the value of the standard acceleration due to gravity), the momentum of the flow (i.e., the mass of the flow multiplied by its velocity), or its power (i.e., the mass flowrate of the flow multiplied by the square of its velocity). There are a variety of regulator mechanisms that can be used to control such characteristics, such as valves or velocity baffles. The regulator includes a powered actuator. The actuator may be powered by such things as a pneumatic cylinder, a hydraulic cylinder, an electric motor or, by the movement of a mechanical sensor. The regulator may incorporate a powered actuator with a manual actuator supplied for back-up in case the power source fails or for manual overrides. The actuator may also include an electrical device that compares the actual regulator setting to a desired regulator setting.

In the embodiment of the invention shown in FIG. 1, part of the supply line 14 is divided into a primary branch 32 and a secondary branch 34. The primary branch extends from a fork 36 to the primary inlet 16, while the secondary branch extends from the fork to the secondary inlet 16'. The control system is designed so that a given volume of flow that enters the clarification tank through the primary inlet in a given amount of time does so at a slower velocity than it would were it entering the tank through the secondary inlet. Thus, increasing the proportion of liquid entering through the secondary inlet increases the head in the head tank and the velocity of the liquid through the smaller inlet. As illustrated, the primary branch 32 and primary inlet 16 have a larger cross-sectional area than the secondary branch 34 and secondary inlet 16'. Alternatively, the two inlets might be placed at different height levels in the clarification tank, or be configured at different tangential angles with respect to the tank. In the illustrated embodiment of the invention, a valve 38 is used as a regulator to control the velocity of flow through the primary branch. Closing the valve decreases the flow through the primary inlet, while correspondingly increasing the proportion of the total flow entering the clarification tank through the secondary inlet. Shutting the valve 38 forces the liquid to travel through a narrower channel. This causes an increase in head in the head tank 12 and an increase in velocity of the flow through the secondary inlets 16'. Conversely, opening the valve causes a decrease in head in the head tank and a decrease in velocity of the flow through the secondary inlets 16'.

Figure 2:
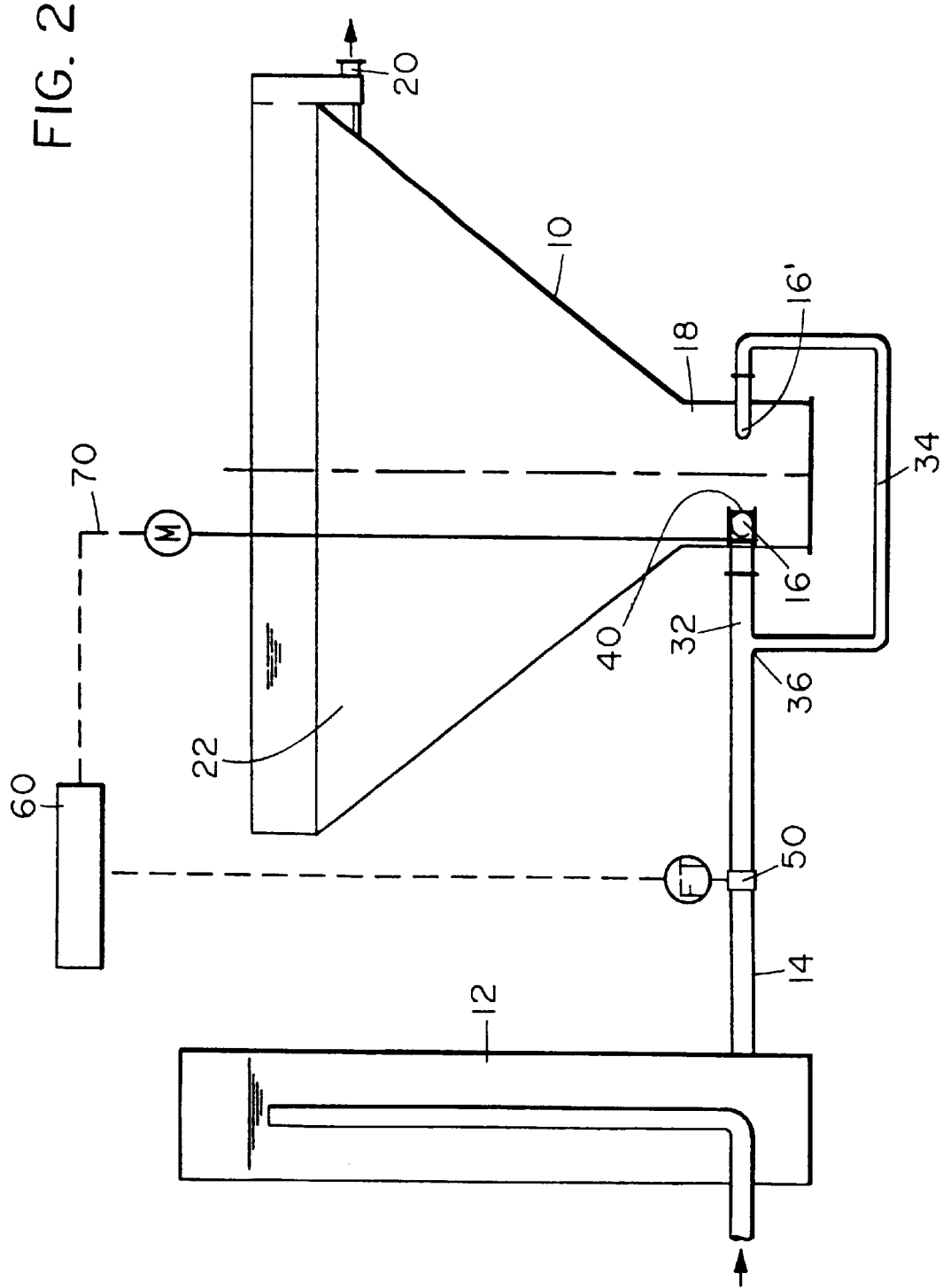
Figure 3:
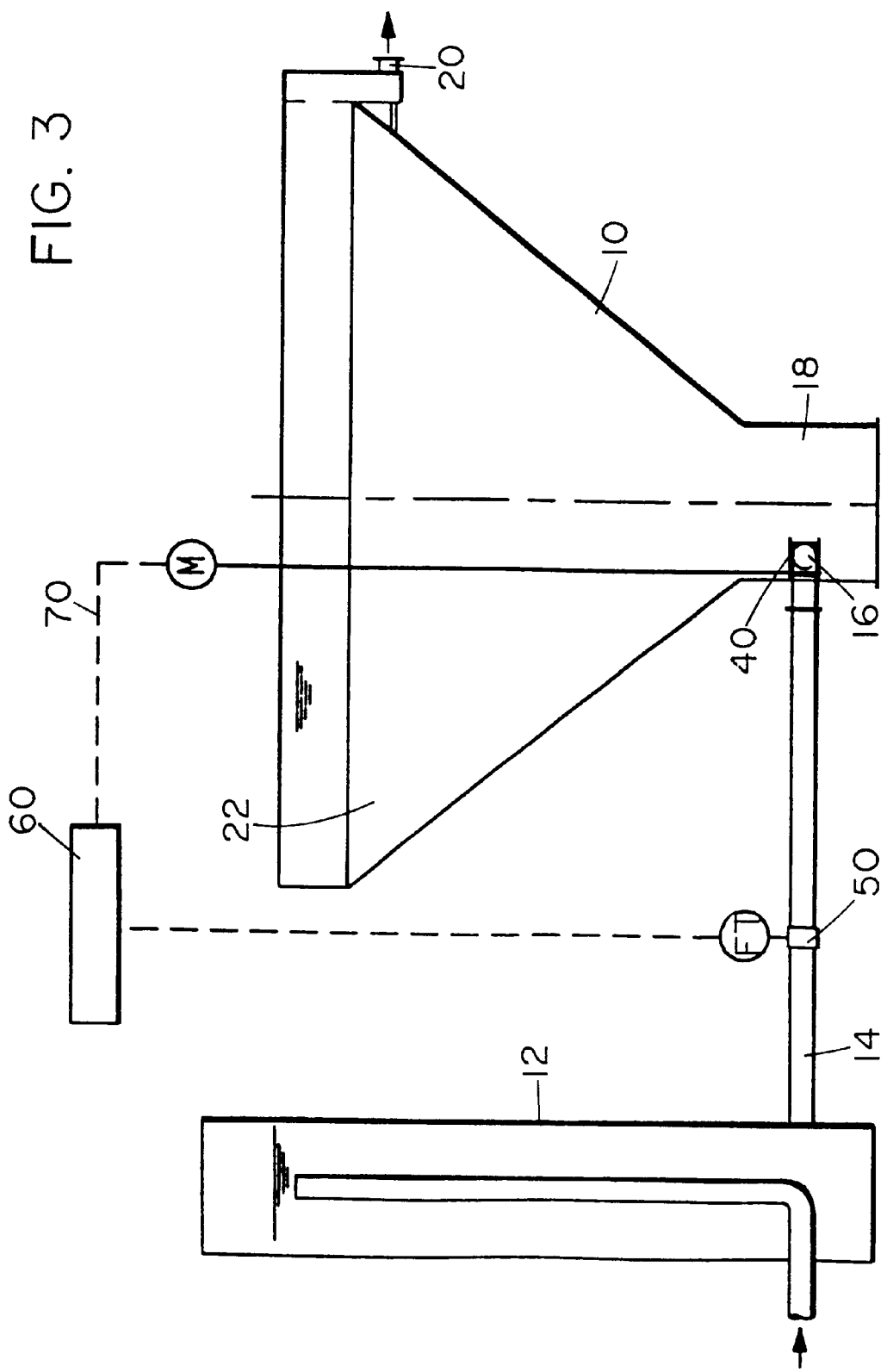

FIG. 2 illustrates an alternate embodiment of the invention in which a velocity baffle 40 is used to regulate the flow. As seen in FIG. 3, the velocity baffle 40 can be used without dividing the supply line 14 into separate branches.

The Sensor

Figure 4:
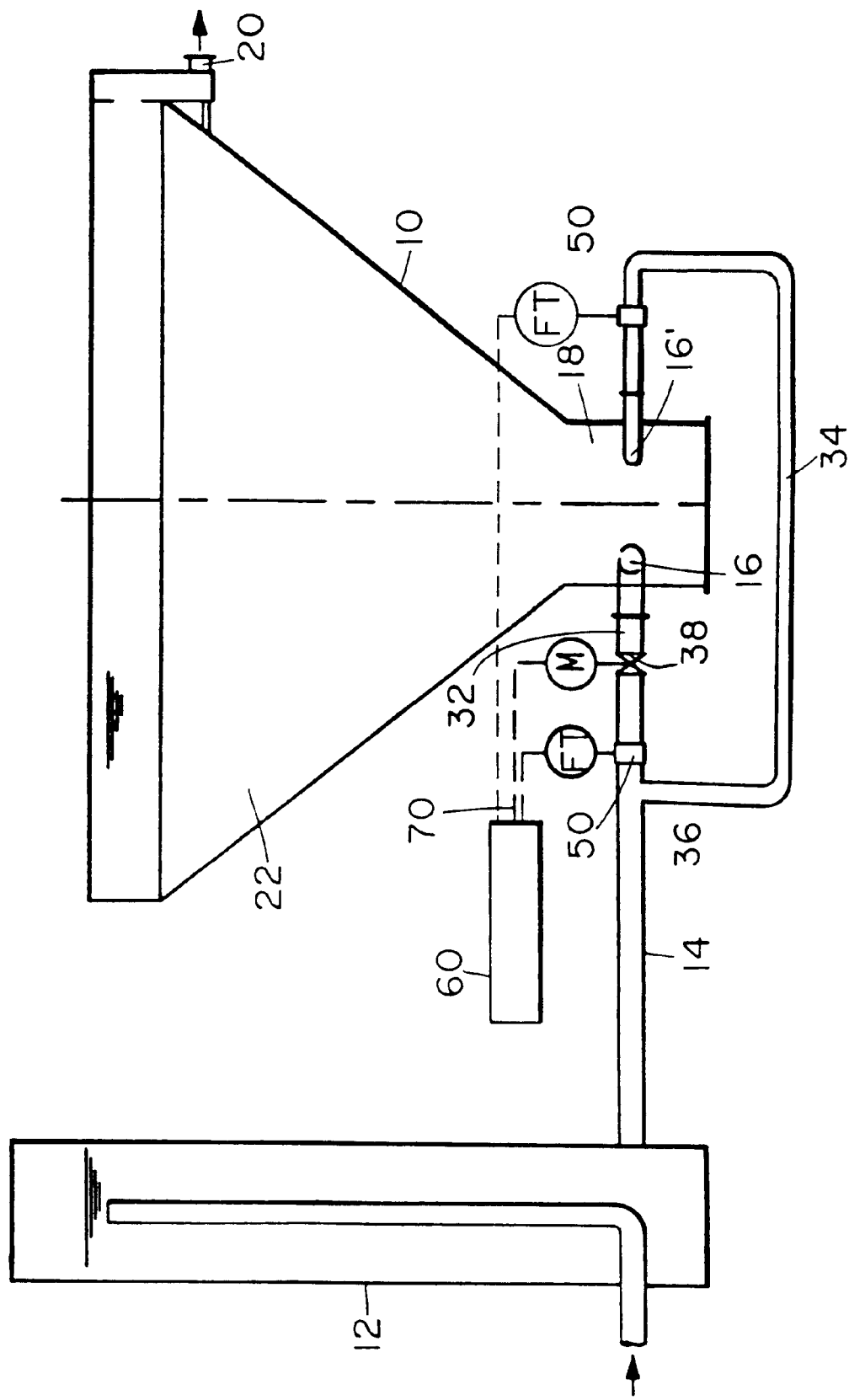

The new control system includes a sensor for measuring one or more characteristics of the flow. In the embodiments of the invention seen in FIGS. 1–3, the sensor is a flow meter 50 that measures the volumetric flowrate through the supply line 14. The volumetric flowrate could also be measured in other locations, such as at a tank inlet, in either the primary branch 32 or the secondary branch 34, or elsewhere in the clarification tank. In FIG. 4, two flow meters 50, 50' measure the volumetric flowrate in both the primary branch 32 and the secondary branch 34.

Figure 5:
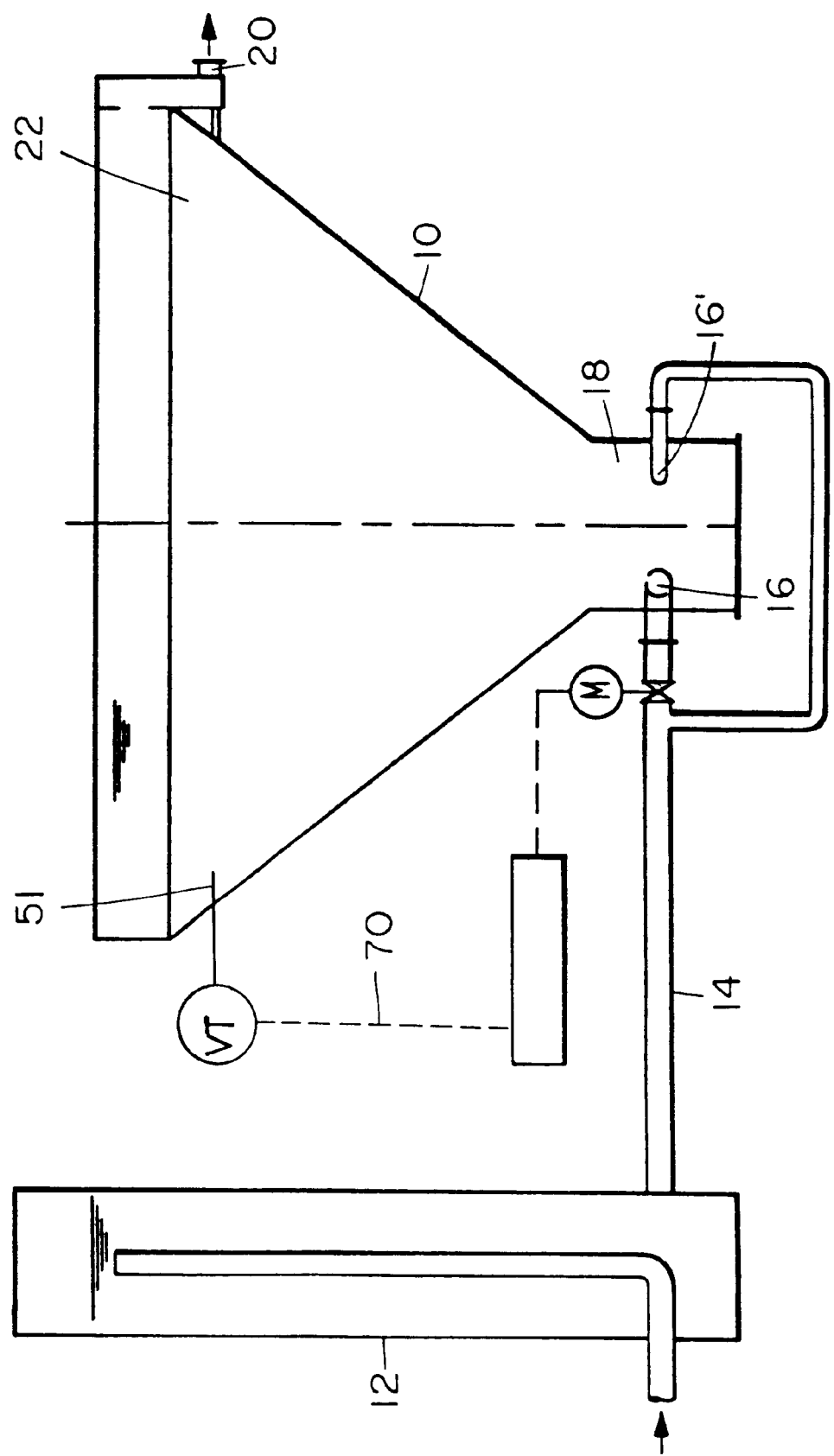

Equivalently, a sensor that measures the velocity of the flow could also be used in virtually any location in the system. In FIG. 5, the sensor is a velocity meter 51 that measures the velocity of the flow in the upper portion 22 of the clarification tank.

Figure 6:
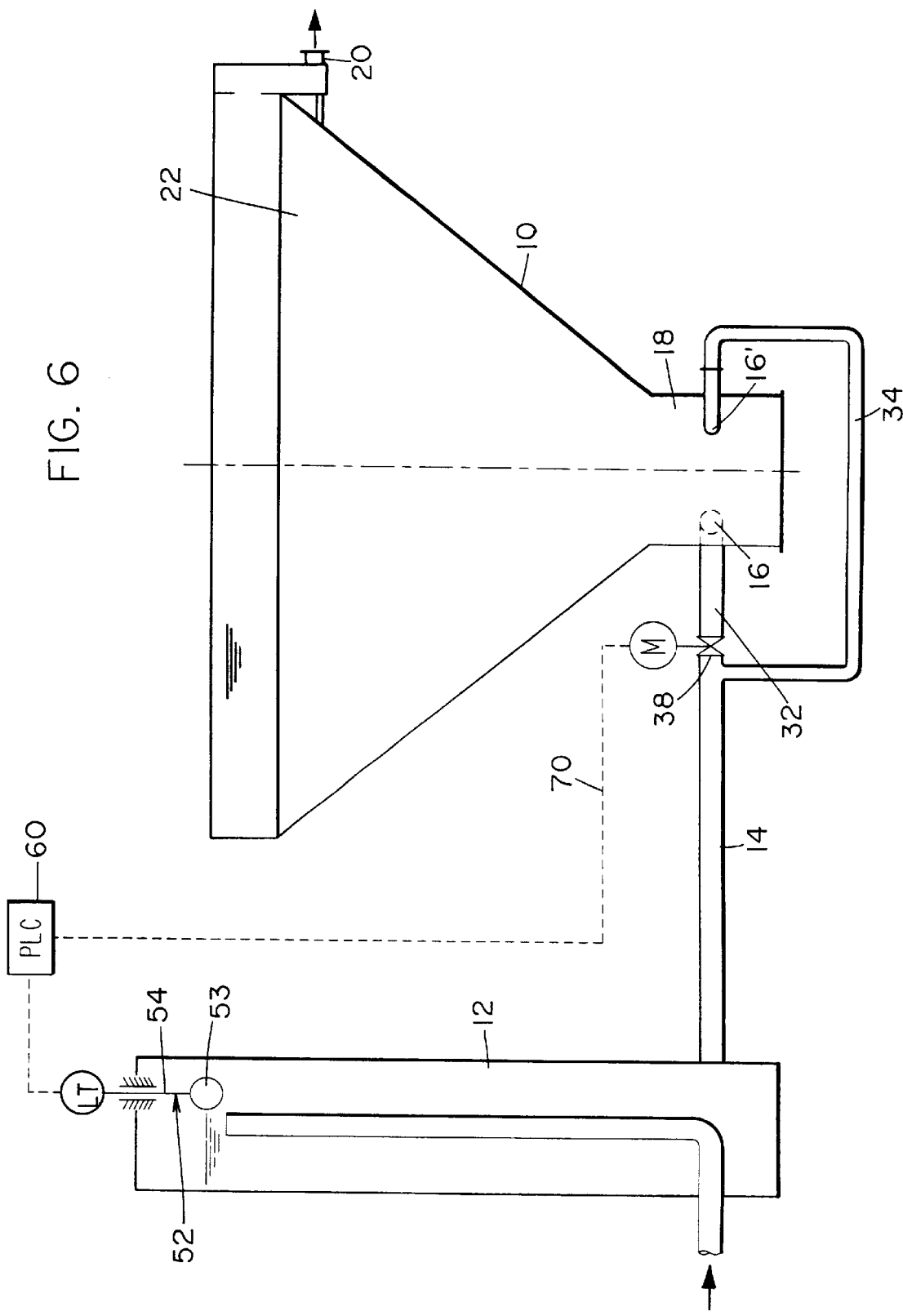

In FIG. 6, the sensor takes the form of a level sensor 52 that is used to detect the level of liquid in the head tank 12. The level sensor includes a ball float 53 mounted on a shaft 54.

Figure 7:
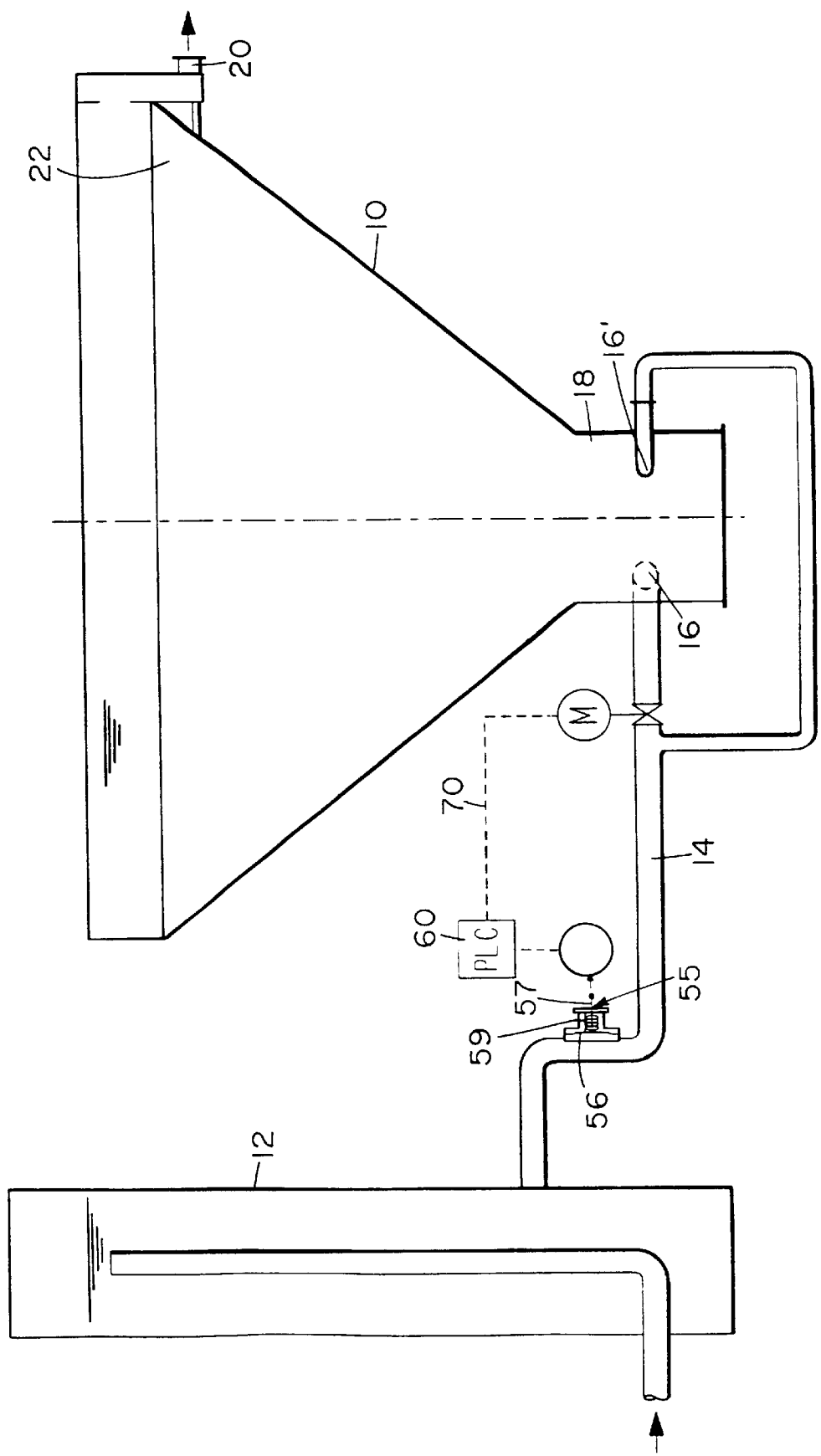
Figure 8:
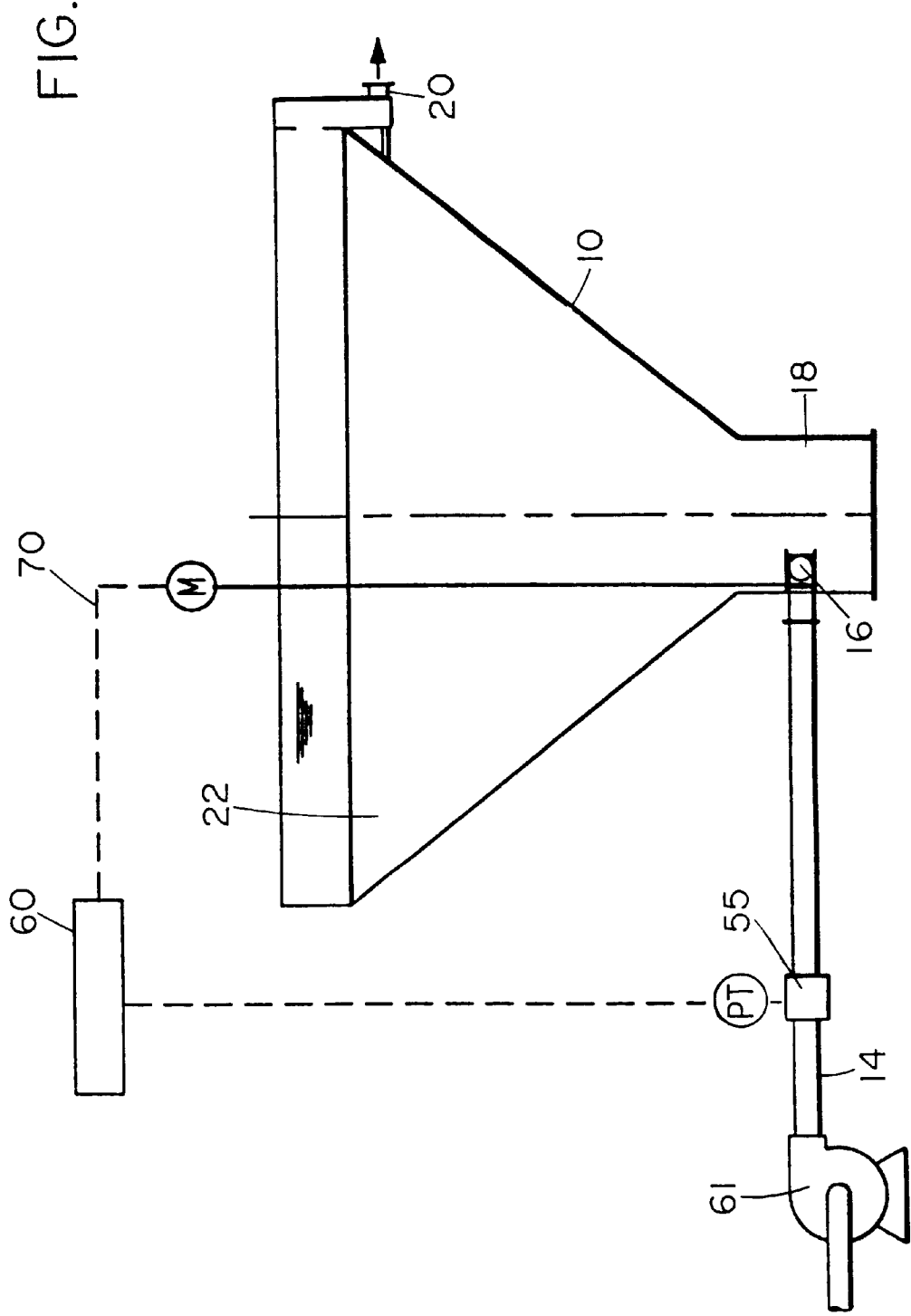

Equivalently, a pressure sensor could be used in the supply line 14 or in the head tank 12. FIG. 7 illustrates a pressure sensor 55 used in the supply line 14. The illustrated pressure sensor includes a membrane 56 on a shaft 57. The membrane constitutes a seal between the contents of the supply line 14 and the environment outside of the supply line 14. The shaft projects outside the pressure sensor housing. A spring 59 biases the membrane. As seen in FIG. 8, a pressure sensor 55 can also be used in a system that includes a pump 61. Other sensors could also be used in such systems.

The sensor may include an electronic device to convert the sensor measurement to an analog or digital, electronic or optical, signal.

Multiple sensors could also be used at the same or different locations throughout the system.

The Mechanism for Adjusting the Regulator

The new control system includes a mechanism for adjusting the regulator based on the measurement of the sensor(s). In the embodiments of the invention illustrated in FIGS. 1–8, that mechanism includes a processor 60 that uses the measurement of the sensor to determine a desirable setting for the regulator. The processor preferably takes the form of an electronic computer, although it could also take the form of an electrical/mechanical device or a completely mechanical device. The desirable setting can be expressed in several ways. It could, for example, be expressed in terms of a designated position of the regulator (such as the valve 38 being 40% open, or the velocity baffle 40 being angled at 45°). Alternatively, the desirable setting could be expressed in terms of an incremental change in a current setting for the regulator (such as the valve being opened 5% wider, or the velocity baffle being angled 5° more tangentially).

The desirable setting for the regulator can be determined in a variety of ways. For example, when the sensor provides a measured value, the desirable setting could be determined by a mathematical calculation using the measured value (either alone or in conjunction with other measured or inputted values). It could also be determined by correlating the measured value (or some other value derived from that measured value) to a series of predetermined settings for possible measured values. It could also be determined by comparing the measured value (or some other value derived from that measured value) to a predetermined preferred value.

The determination of the desirable setting for the regulator need not be based solely on a measured value from the sensor. For example, the determination can also be affected by an input as to a non-flow related characteristic, such as a manual input as to the raw fluid quality (such as temperature or turbidity), or the type of fluid treatment chemical being used. Such input as to a non-flow related characteristic could also be automatically input based on a sensed measurement.

Figure 9:
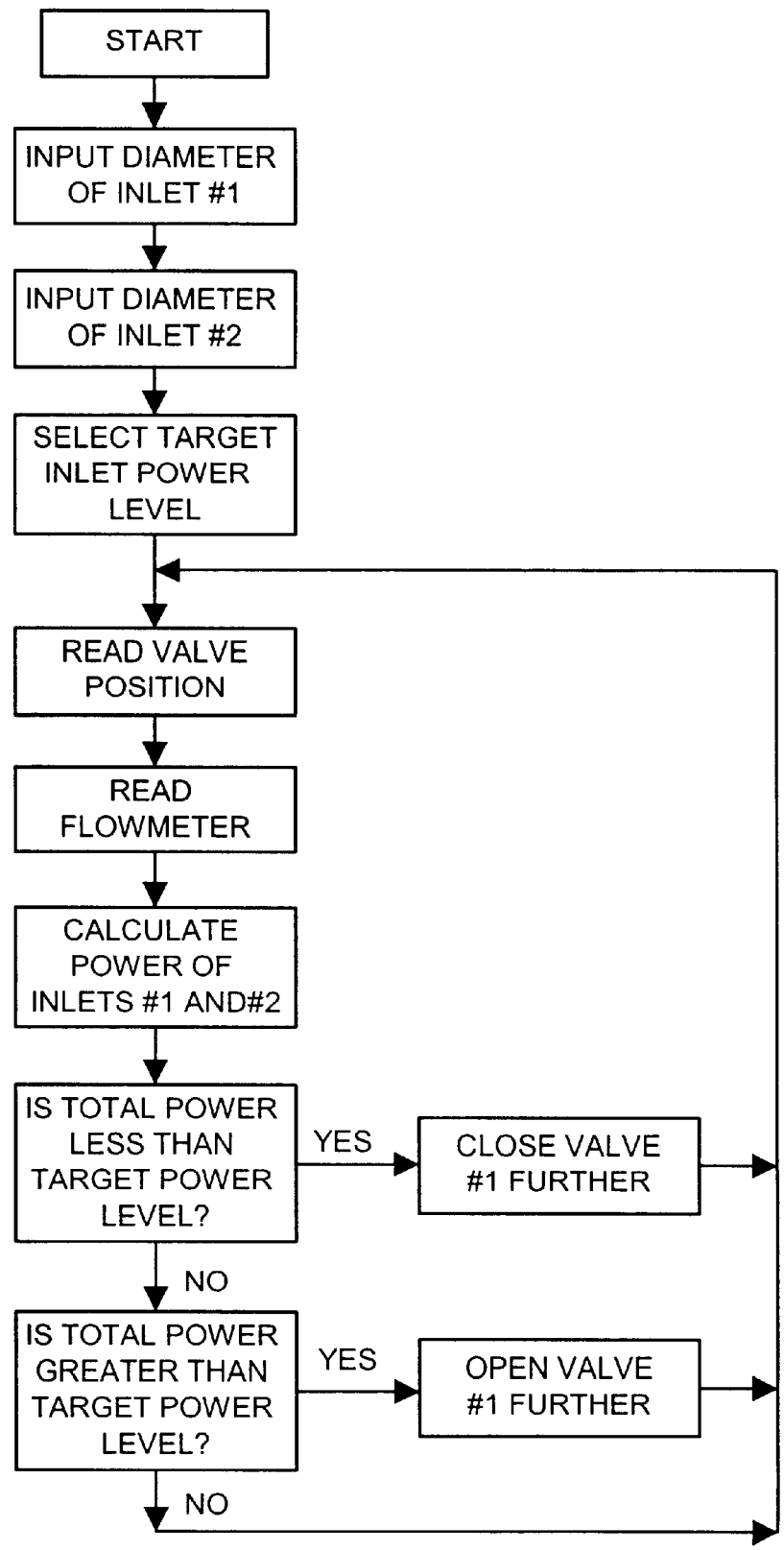
FIGS. 9–14 are block diagrams of various embodiments of programming algorithms that could be used in controllers used in the present invention.

FIG. 9 provides an algorithm that determines a desirable setting for the valve 38 seen in FIG. 1 based on one particular characteristic of the flow, namely, its power. In that algorithm, the power of the flow entering the clarification tank 10 is calculated using three kinds of information: a measured value of the volume of flow through the supply line 14; inputted information about the size, length, and fittings between the flowmeter 50 in supply line 14 and the inlets 16 and 16'; and information concerning the current setting of the valve. The calculated power is then compared to a predetermined target power level. If the calculated power is less than the predetermined target power level, then the algorithm leads to a determination that the valve should be incrementally closed. If the calculated power is greater than the predetermined target power level, then the algorithm leads to a determination that the valve should be incrementally opened.

Figure 10:
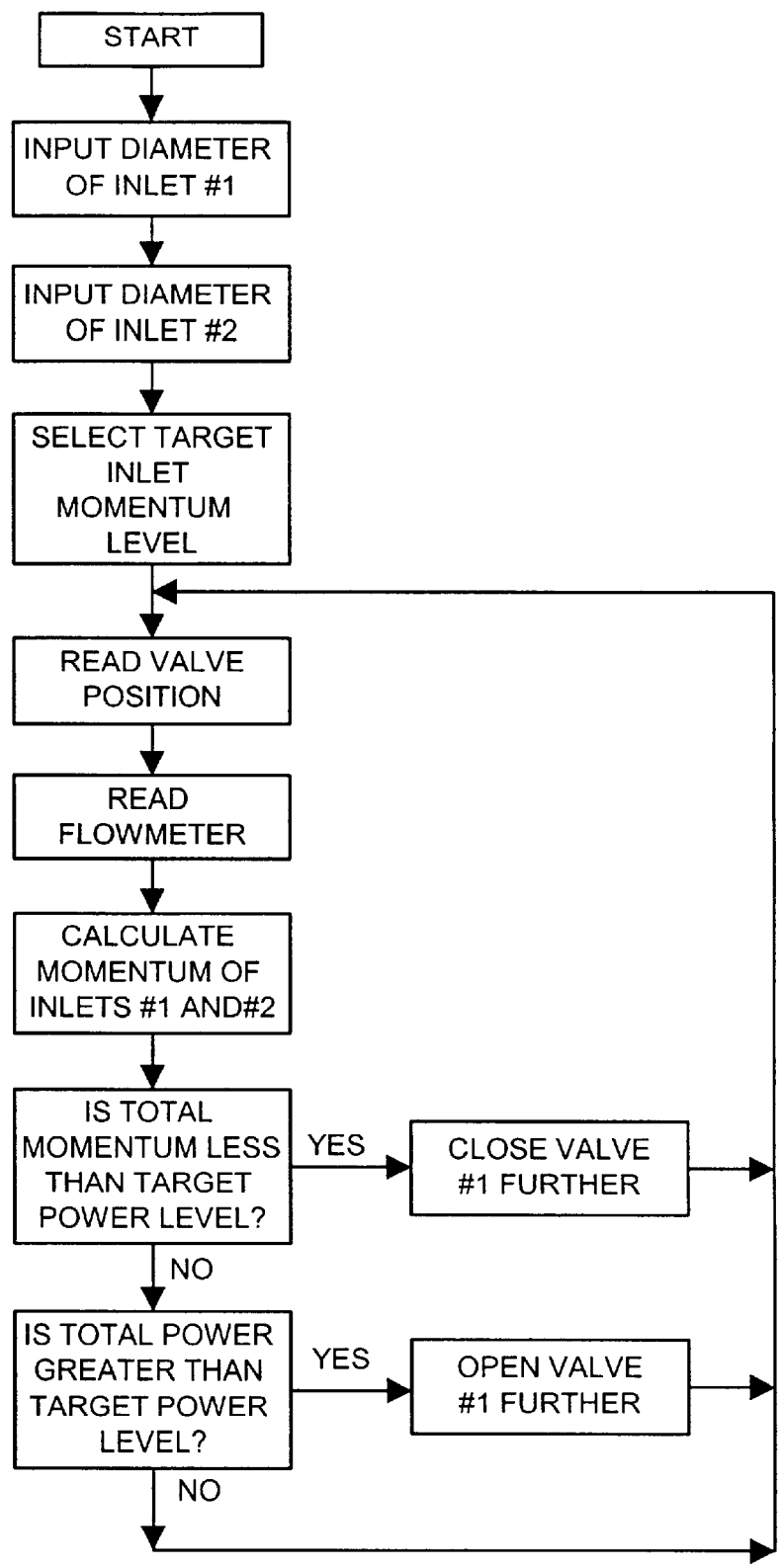

FIG. 10 provides an algorithm that could be used in the same system when it is desired to control the momentum of the flow, rather than its power. This algorithm leads to a determination that the valve 38 should be incrementally closed if the total momentum (calculated from inputted information about the size, length, and fittings of the piping between the flow meter 50 in the supply line 14 and the inlets 16 and 16' and the measured value of the flowrate at the flowmeter 50) is less than a target momentum, and should be incrementally opened if the momentum is greater than the target momentum.

Figure 11:
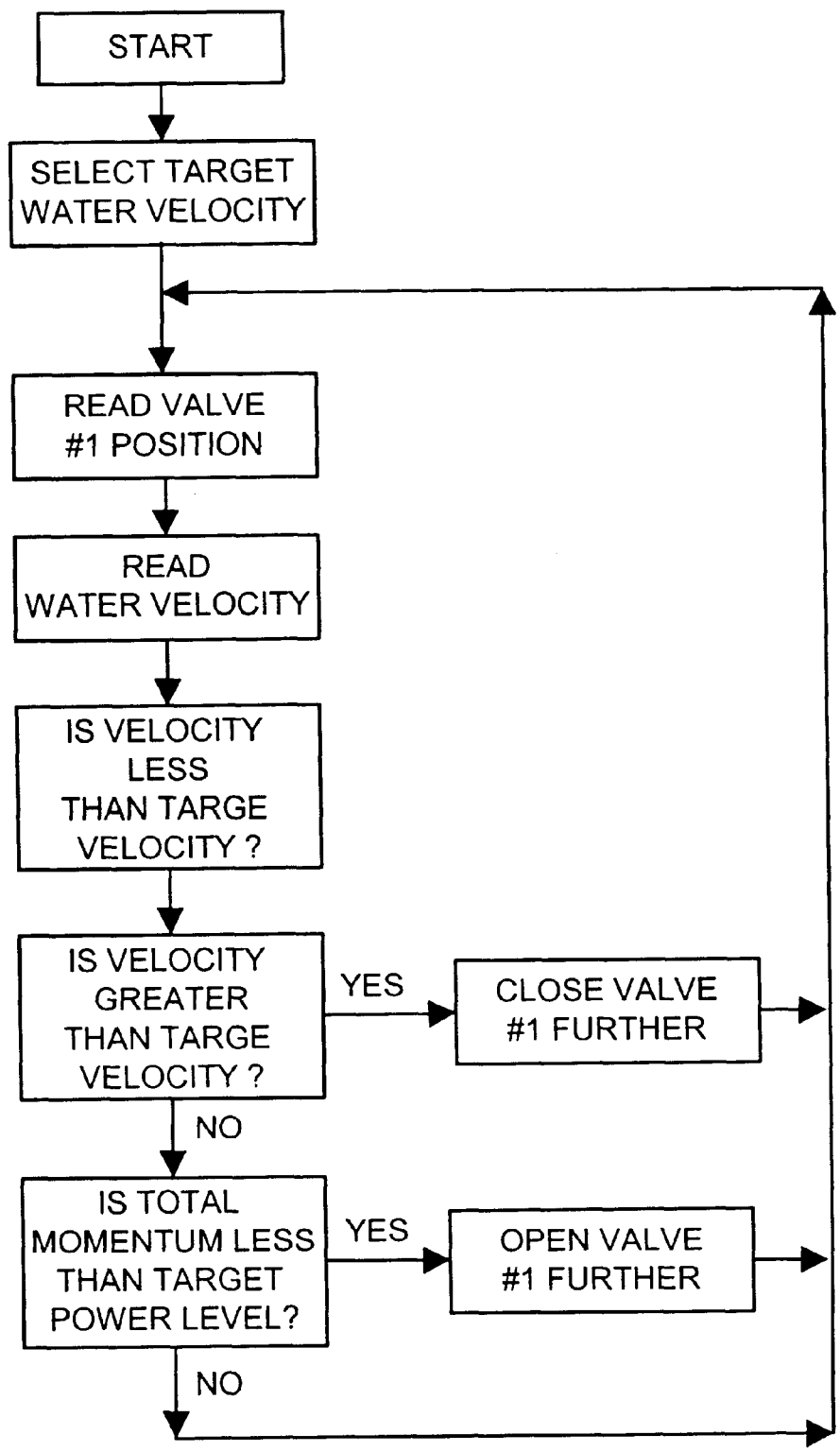

FIG. 11 provides a comparable algorithm that could be used when the flow meter 50 of FIG. 1 has been replaced by a velocity meter in the clarification tank 10, as shown in FIG. 5, and it is desired to control the velocity of the flow at the measured point within the clarification tank. This algorithm leads to a determination that the valve 38 should be incrementally closed if the velocity in the clarification tank (which is measured directly by the velocity meter 51) is less than a target velocity, and should be incrementally opened if the velocity is greater than the target velocity.

Figure 12:
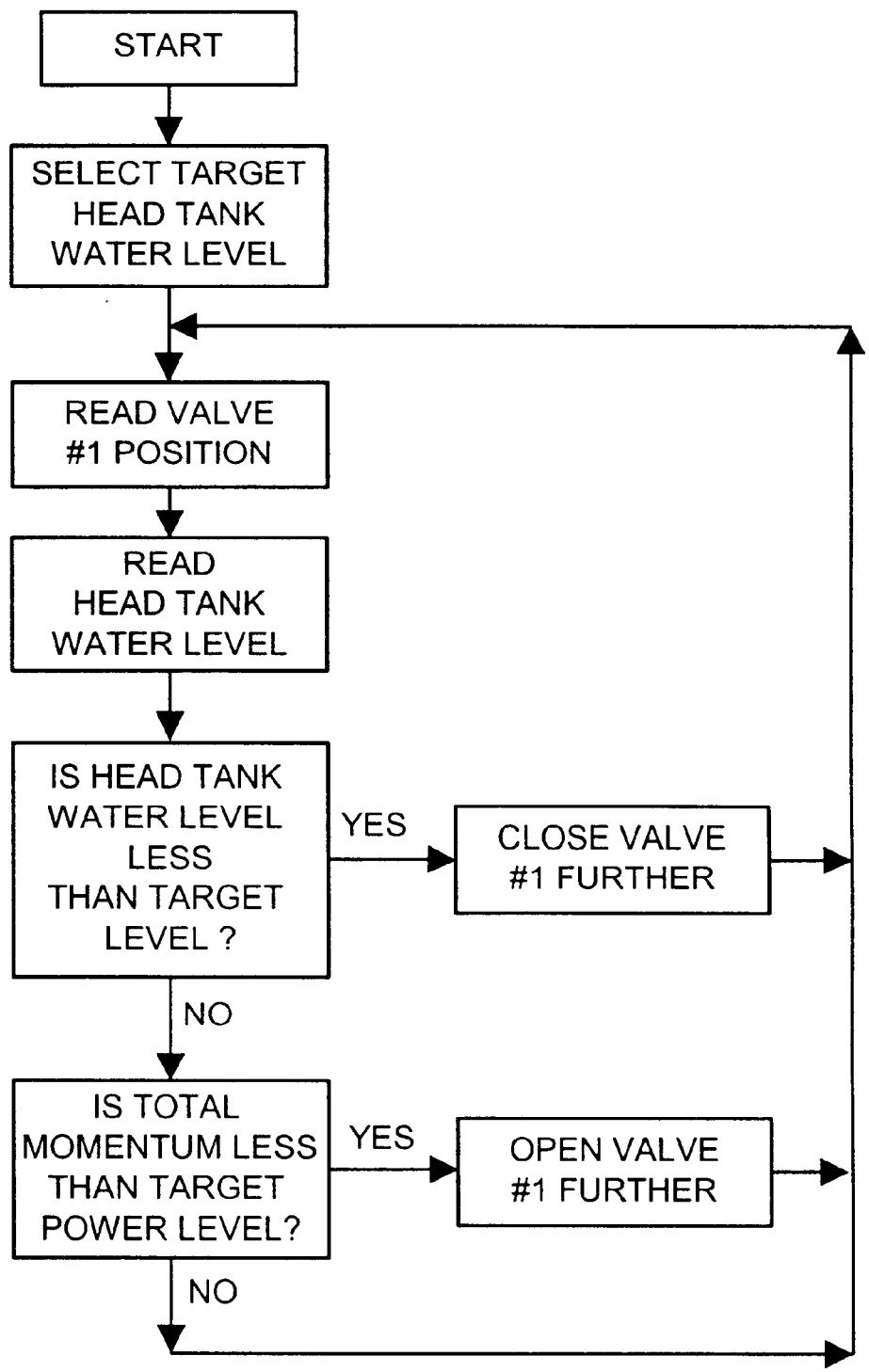

FIG. 12 provides an algorithm that could be used in the system illustrated in FIG. 6, when it is desired to control the liquid level in the head tank 12. This algorithm leads to a determination that the valve 38 should be incrementally closed if the level in the head tank (as measured by the level sensor 52) is less than a target level, and should be incrementally opened if the level is greater than the target level. Indeed, to help prevent overflows, it may be useful to program the processor 60 to automatically select a setting that incrementally opens the valve 38 when the level in the head tank exceeds a predetermined level, or to override the valve from being closed any further when the level in the head tank reaches a predetermined level.

Figure 13:
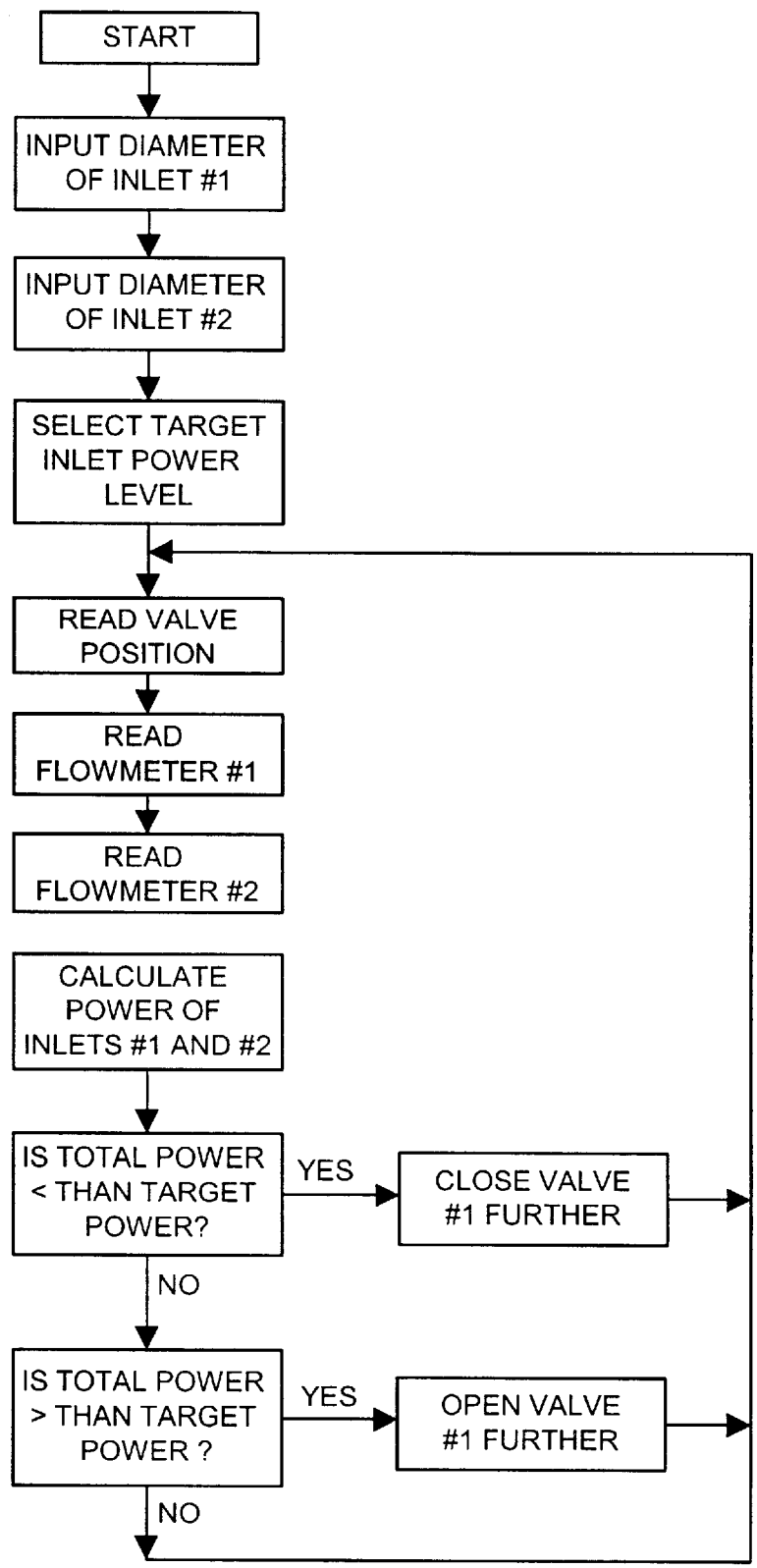

FIG. 13 provides an algorithm that could be used in the system illustrated in FIG. 4, when it is desired to control the power of the flow. The algorithm leads to a determination that the valve 38 should be incrementally closed if the total power (calculated from the inputted diameter of the inlets 16 and 16' and the measured value of the flowrate at the flow meters 50 and 50') is less than a target power, and should be incrementally opened if the power is greater than the target power.

Figure 14:
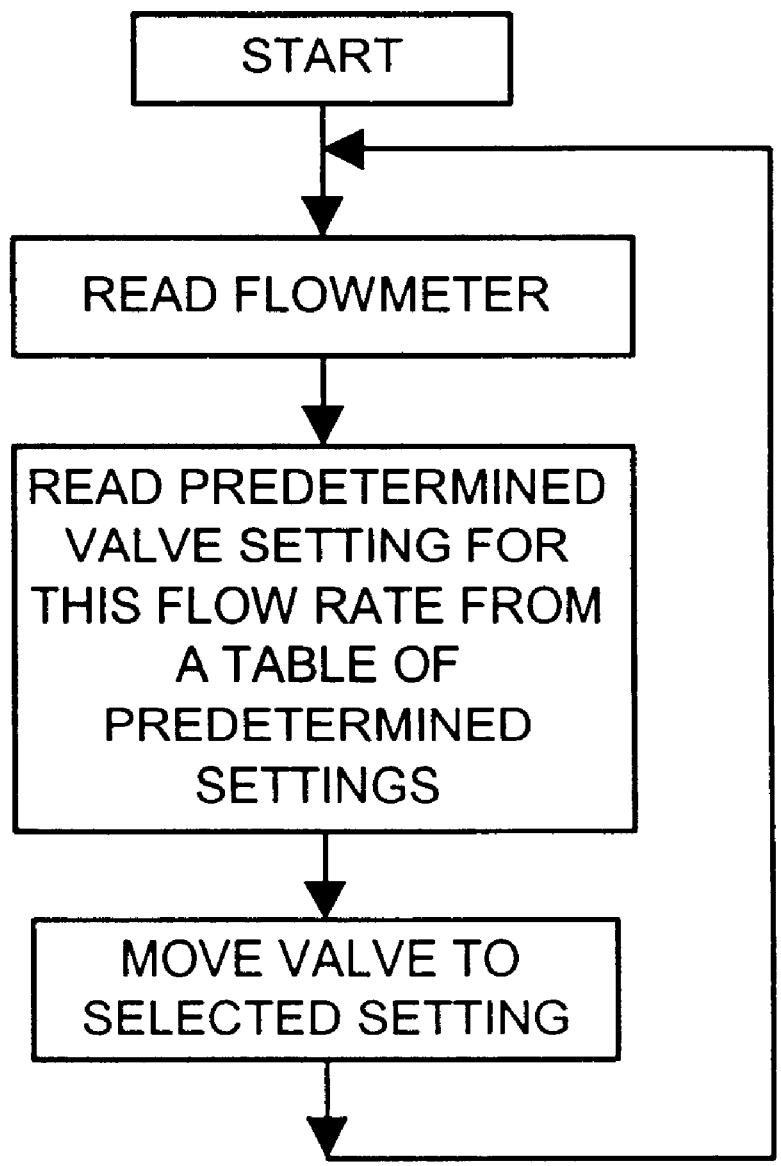

FIG. 14 provides an algorithm that could be used in the system illustrated in FIG. 1, when it is desired to control the power, momentum, velocity head, or pressure of the flow. The algorithm correlates a measured value from the sensor to a predetermined regulator setting.

The processor 60 could be constructed to enable the operator to manually select between multiple methods for determining the desirable setting, or between multiple measured characteristics for use in determining the desired setting for the regulator. For example, the processor could be provided with a switch enabling the operator to elect between one algorithm that determines a desirable setting based on level in the head tank 12, and another algorithm that determines a desirable setting based on liquid momentum at the inlets 16, 16'. Preferably, the system also includes a manual override that permits the operator to override the setting determined by the processor.

These embodiments of the invention that utilize a processor to determine a desirable setting for the regulator include a relay 70 that communicates the desirable setting to the regulator, where it is implemented. The relay may constitute, for example, electrical wiring or fiber optic cables. The desirable setting may be communicated as either a digital or an analog signal. The setting can be implemented, for example, by a motor-operated actuator.

As an alternative to the processor 60 and the relay 70, the system may include a mechanical device for adjusting the regulator based on the measurement of the sensor(s). For example, FIG. 15 shows a mechanical version of the system illustrated in FIG. 6. In this embodiment of the invention, the processor 60 is replaced by a mechanical device including a rocker arm 80 and a pivot 82. The relay 70 is replaced by a connecting rod 84 that communicates and implements the desirable actuator setting. The relative position of the pivot along the length of the rocker arm 80 determines how the regulator setting is adjusted for changes in sensor measurement. As the float 53 rises in the head tank 12, the shaft 54 rises, causing the rocker arm 80 to turn on the pivot. This motion causes the connecting rod 84 to rotate the actuator, opening the valve.

Similarly, FIG. 16 shows a mechanical version of the system illustrated in FIG. 7. In this embodiment of the invention, the processor 60 has also been replaced by a mechanical device including a rocker arm 80' and a pivot 82'. The relay 70 is replaced by a connecting rod 84 that communicates and implements the desirable actuator setting. As the pressure in the supply line 14 increases, the shaft 57 moves inwardly, causing the rocker arm 80' to turn on the pivot. This motion causes the connecting rod 84' to rotate the actuator, opening the valve.

This detailed description has been given for clarity of understanding only. It is not intended and should not be construed as limiting the scope of the invention, which is defined in the following claims.

We claim:

1. An upflow clarification tank system in which a flow of liquid may be clarified, the system comprising:

an upflow clarification tank;

first and second inlets connecting the tank with a single source of the flow of liquid to be clarified;

a valve that distributes the flow of liquid between the inlets;

a sensor that measures one or more characteristics of the flow; and means for automatically adjusting the valve based on the sensor measurement.

2. An upflow clarification tank system as recited in claim 1, in which the valve is adjusted to change the power of the flow.

3. An upflow clarification tank system as recited in claim 1, in which the valve is adjusted to change the pressure of the flow.

4. An upflow clarification tank system as recited in claim 1, in which the valve is adjusted to change the velocity of the flow.

5. An upflow clarification tank system as recited in claim 1, in which the valve is adjusted to change the momentum of the flow.

6. An upflow clarification tank system as recited in claim 1, in which the valve is adjusted to change the velocity head of the flow.

7. An upflow clarification tank system as recited in claim 1, in which:

the inlets have different diameters.

8. An upflow clarification tank system as recited in claim 1, in which the sensor measures a pressure of the liquid.

9. An upflow clarification tank system as recited in claim 8, in which the pressure is measured in a supply line to the clarification tank.

10. An upflow clarification tank system as recited in claim 8, in which the pressure is measured in a head tank.

11. An upflow clarification tank system as recited in claim 1, in which the sensor measures a velocity of the liquid.

12. An upflow clarification tank system as recited in claim 11, which the velocity is measured in a tank inlet.

13. An upflow clarification tank system as recited in claim 11, in which the velocity is measured in a supply line.

14. An upflow clarification tank system as recited in claim 1, in which the sensor measures a head level.

15. An upflow clarification tank system as recited in claim 1, in which the automatic adjusting means comprises a mechanical linkage from the sensor to the valve.

16. An upflow clarification tank system as recited in claim 1, in which the second inlet is configured differently than the first inlet.

17. An upflow clarification tank system as recited in claim 1, in which the inlets are positioned at different elevations in the tank.

18. An upflow clarification tank system in which a flow of liquid may be clarified, the system comprising:

an upflow clarification tank;

first and second inlets connecting the tank with a single source of the flow of liquid to be clarified;

a valve that distributes the flow of liquid between the inlets;

a sensor that measures one or more characteristics of the flow;

a processor that uses the sensor measurement to determine a desirable setting for the valve; and means for automatically adjusting the valve based on the desirable setting.

19. An upflow clarification tank system as recited in claim 18, in which the desirable setting is a designated position of the valve.

20. An upflow clarification tank system as recited in claim 18, in which the desirable setting is an incremental change in a current setting for the valve.

21. An upflow clarification tank system as recited in claim 18, and further comprising means for manually selecting between multiple methods for determining the desirable setting.

22. An upflow clarification tank system as recited in claim 21, in which the manual selection means enables a user to select among multiple measured characteristics for use in determining the desirable setting for the valve.

23. An upflow clarification tank system as recited in claim 18, in which the desirable setting is determined by a mathematical calculation using the sensor measurement.

24. An upflow clarification tank system as recited in claim 18, in which the desirable setting is determined by a mathematical calculation using the sensor measurement and a second sensor measurement.

25. An upflow clarification tank system as recited in claim 18, in which the desirable setting is determined by correlation of the sensor measurement to a series of predetermined settings for possible measured values.

26. An upflow clarification tank system as recited in claim 18, in which the desirable setting is determined by comparing the sensor measurement to a predetermined preferred value.

27. An upflow clarification tank system as recited in claim 18, in which the desirable setting is affected by an input as to one or more non-flow related characteristics.

28. An upflow clarification tank system as recited in claim 27, in which the non-flow related characteristic is one of either raw fluid quality or type of fluid treatment chemical being used.

29. An upflow clarification tank system as recited in claim 27, in which the input of the non-flow related characteristic is an automatic input of a reading from a second sensor.

30. An upflow clarification tank system as recited in claim 18, in which the processor automatically selects a setting that reduces the pressure required to maintain the rate of the flow when a level in a head tank exceeds a predetermined level.

31. An upflow clarification tank system as recited in claim 18, in which the system further comprises a manual override.

32. An upflow clarification tank system in which a flow of liquid may be clarified, the tank system comprising:
   a clarification tank with a lower cylindrical section;
   a tangential inlet on the lower cylindrical section of the tank;
   a horizontally-discharging velocity baffle on the inlet that that feeds the liquid into the tank in a tangential direction and controls the flow of liquid through the inlet;
   a sensor that measures one or more characteristics of the flow; and
   means for automatically adjusting the baffle based on the sensor measurement.

33. An upflow clarification tank system as recited in claim 32, in which the baffle is adjusted to change the power of the flow.

34. An upflow clarification tank system as recited in claim 32, in which the baffle is adjusted to change the pressure of the flow.

35. An upflow clarification tank system as recited in claim 32, in which the baffle is adjusted to change the velocity of the flow.

36. An upflow clarification tank system as recited in claim 32, in which the baffle is adjusted to change the momentum of the flow.

37. An upflow clarification tank system as recited in claim 32, in which the baffle is adjusted to change the velocity head of the flow.

38. An upflow clarification tank system as recited in claim 32, in which the sensor measures a pressure of the liquid.

39. An upflow clarification tank system as recited in claim 38, in which the pressure is measured in a supply line to the clarification tank.

40. An upflow clarification tank system as recited in claim 32, in which the sensor measures a velocity of the liquid.

41. An upflow clarification tank system as recited in claim 32, in which the sensor measures a head level.

42. An upflow clarification tank system as recited in claim 32, in which the automatic adjusting means comprises a mechanical linkage from the sensor to the baffle.

43. An upflow clarification tank system in which a flow of liquid may be clarified, the tank system comprising:
   a clarification tank;
   a tangential inlet near the bottom of the tank;
   a horizontally-discharging velocity baffle on the inlet that controls the flow of liquid through the inlet;
   a sensor that measures one or more characteristics of the flow;
   a processor that uses the sensor measurement to determine a desirable setting for the baffle; and
   means for automatically adjusting the baffle based on the desirable setting.

44. An upflow clarification tank system as recited in claim 43, and further comprising means for manually selecting between multiple methods of determining the desirable setting.

45. An upflow clarification tank system as recited in claim 44, in which the manual selection means enables a user to select among multiple measured characteristics for use in determining the desirable setting for the baffle.

46. An upflow clarification tank system as recited in claim 44, in which the processor automatically selects a setting that reduces the pressure required to maintain the rate of the flow when a level in a head tank exceeds a predetermined level.

47. An upflow clarification tank system as recited in claim 43, which the system further comprises a manual override.

* * * * *

UNITED STATES PATENT AND TRADEMARK OFFICE
CERTIFICATE OF CORRECTION

PATENT NO. : 6,673,240 B2
DATED : January 6, 2004
INVENTOR(S) : John J. Fassbender and Donald Neil Ruehrwein It is certified that error appears in the above-identified patent and that said Letters Patent is hereby corrected as shown below:

Column 7,
Lines 49-50, replace "of the tank" with -- near the bottom of the tank --
Line 51, replace "...inlet that" with -- ...inlet --

Column 8,
Line 43, replace "of determining" with -- for determining --

Signed and Sealed this

Twelfth Day of October, 2004

JON W. DUDAS
*Director of the United States Patent and Trademark Office*